United States Patent

[11] 3,567,156

| [72] | Inventor | Davis L. Bauer<br>Hatton, Wash. (Star Route, Connell, Wash., 99326) |
|---|---|---|
| [21] | Appl. No. | 865,025 |
| [22] | Filed | Oct. 9, 1969 |
| [45] | Patented | Mar. 2, 1971 |

[54] AIRCRAFT AND VEHICLE COMBINATION
8 Claims, 9 Drawing Figs.

[52] U.S. Cl..................................................... 244/2,
258/1.2
[51] Int. Cl..................................................... B64d 5/00
[50] Field of Search........................................... 244/2, 3, 1,
114, 140; 258/1.4, 1.2

[56] References Cited
UNITED STATES PATENTS

| 2,639,107 | 5/1953 | Brown.......................... | 244/3 |
| 2,729,405 | 1/1956 | Doolittle...................... | 244/2 |

Primary Examiner—Milton Buchler
Assistant Examiner—C. A. Rutledge
Attorney—Wells & St. John ABSTRACT: A primary aircraft has an enlarged interior recess within which one or more surface vehicles can be received. Reception of surface vehicles is accomplished during flight of the primary aircraft. The surface vehicles are selectively attached to a secondary aircraft suspended by cable and retrieved into the primary aircraft along with the vehicle.

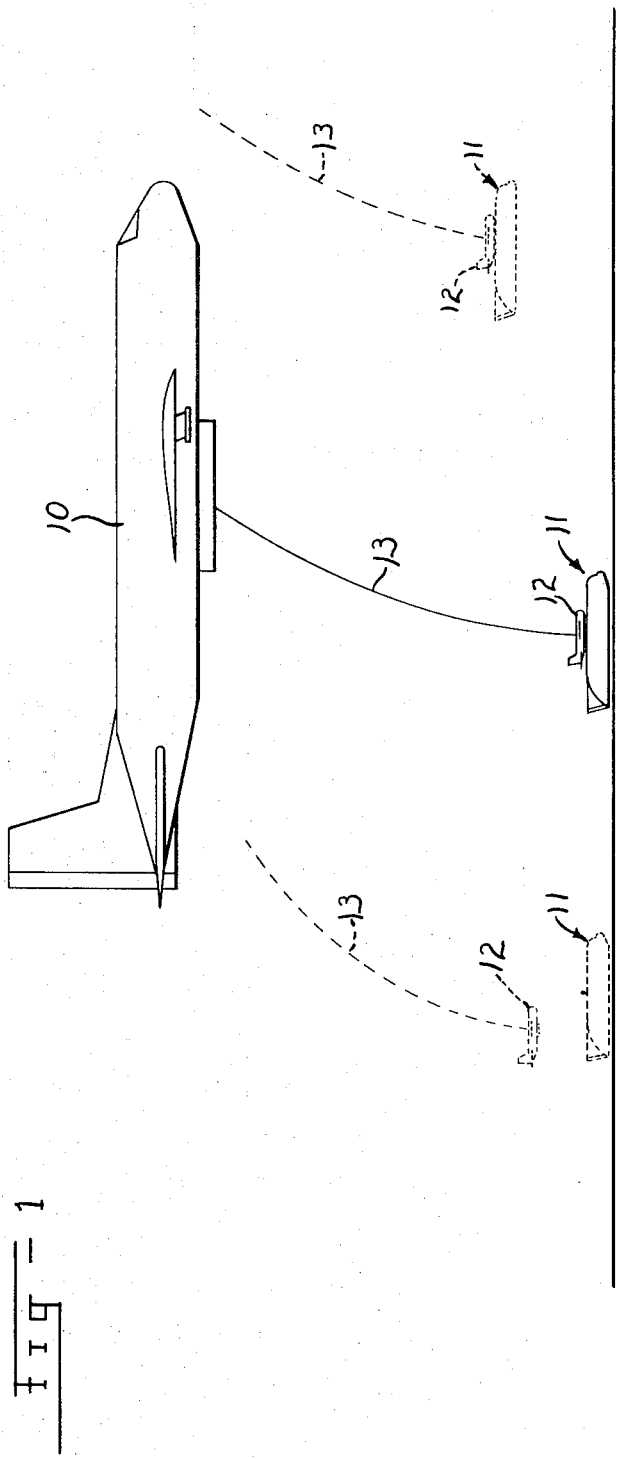

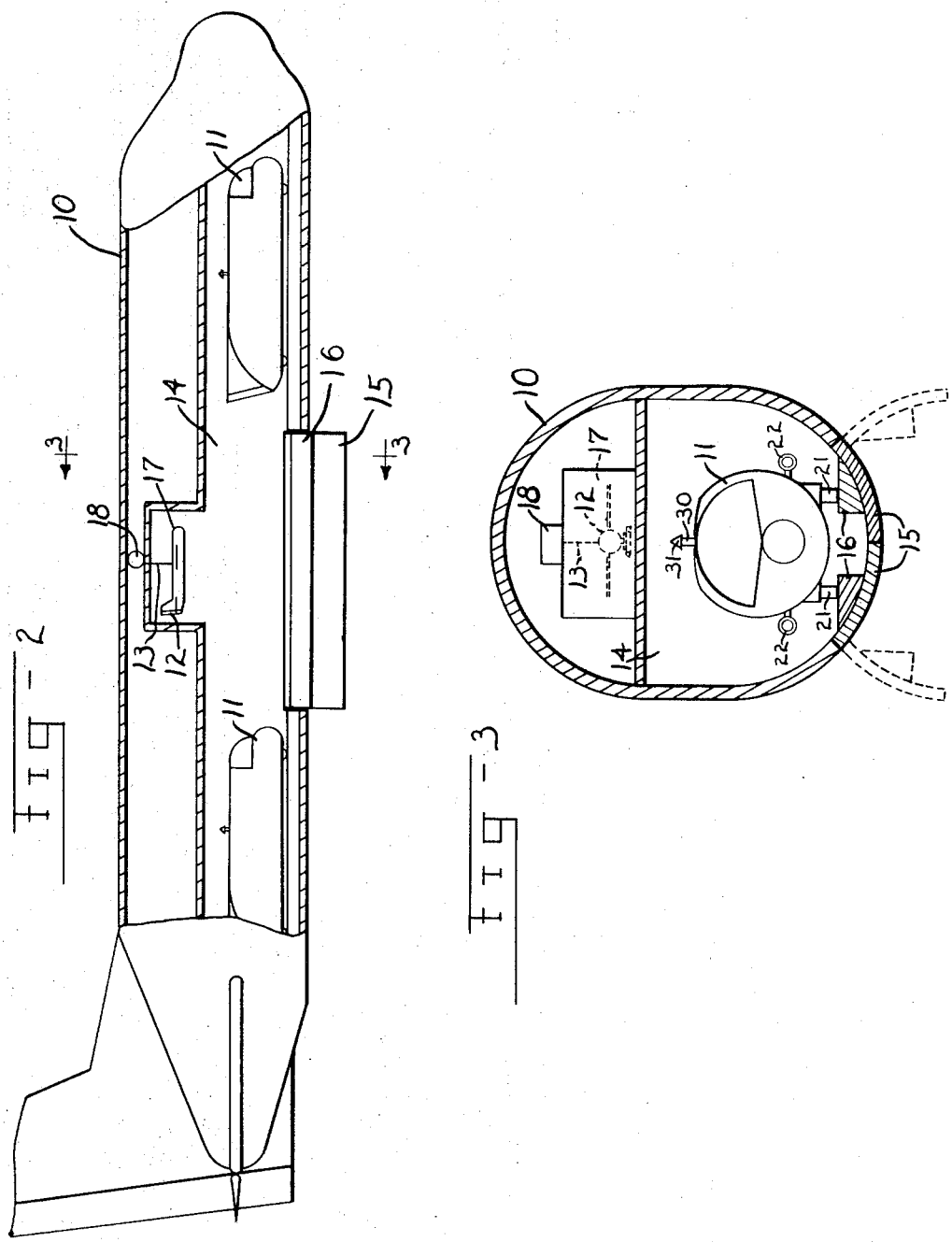

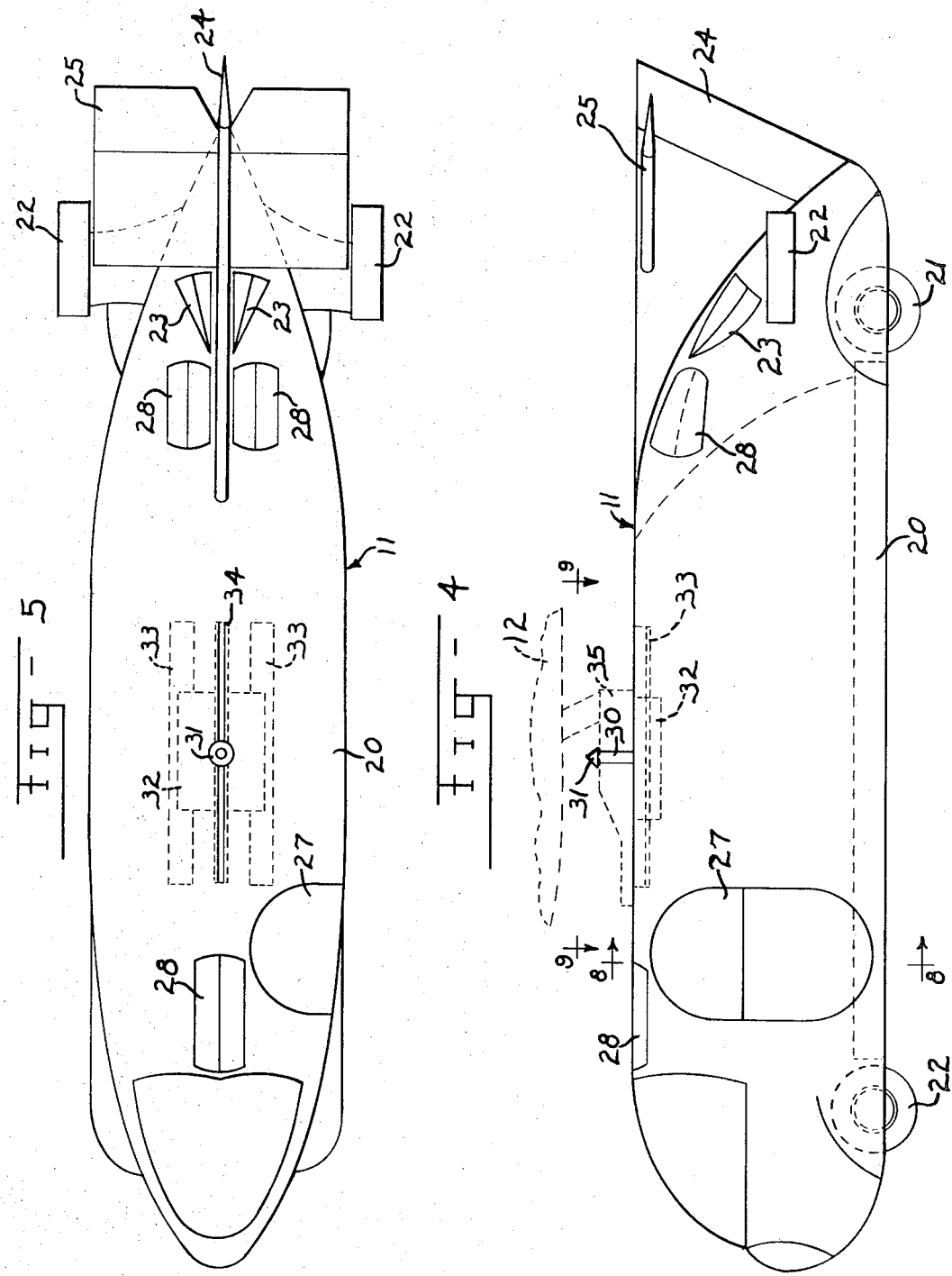

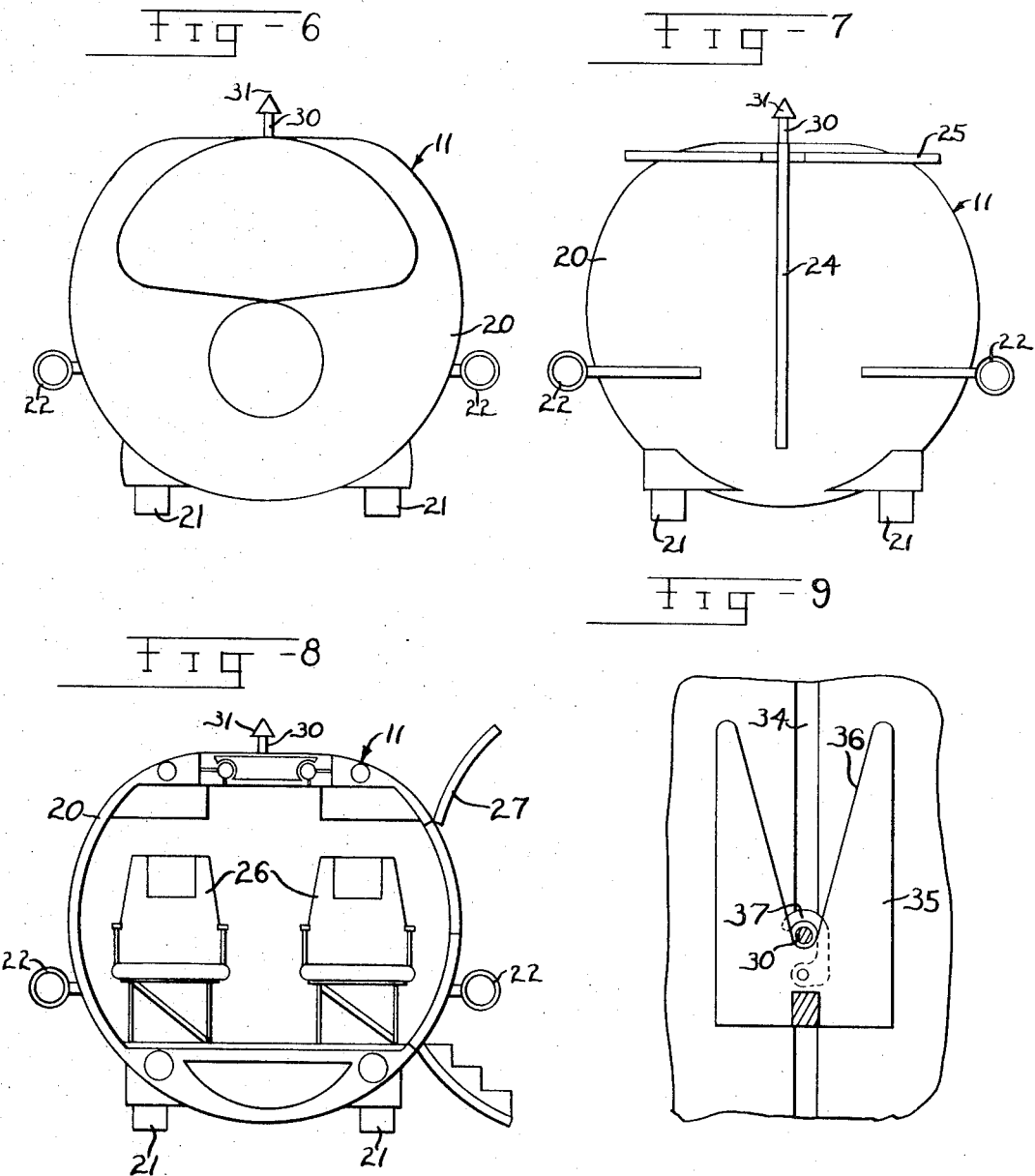

AIRCRAFT AND VEHICLE COMBINATION

BACKGROUND OF THE INVENTION

The present invention resulted from an analysis of the difficulties encountered in modern air travel with the advent of larger jet aircraft and their resulting requirements for longer and heavier runways. Added to the problems of sheer size is the problem of airport congestion that results from greater numbers of aircraft landing and taking off. In addition, runways must be constructed in relatively great widths in order to accommodate the increasing wing span of modern large planes.

The present invention eliminates the need for wide runways in most air terminal facilities by minimizing the number of actual landings and takeoffs required by aircraft. In place of the usual landing procedure, a surface vehicle is lowered from the flying plane and detached on the ground or other surface at each intermediate delivery and reception facility. Similarly, such vehicles can be attached to the plane and pulled up into it. Because such vehicles need carry only that fuel necessary to attain ground speed required for pickup, their weight can be kept comparatively light in relation to the weight of conventional aircraft. In addition, they require no wings and the width of the surface on which these vehicles operate need not be great. Several surface strips might be placed side by side and vehicles operated on them simultaneously while handled by aircraft flying above the strips at differing heights.

Prior patents have recognized the problem of landing and taking off from airstrips with a heavy airframe. U.S. Pat. No. 2,921,756 discloses a detachable airframe including heavy landing gear used only for takeoff and landing purposes. A towing arrangement for aircraft is shown in U.S. Pat. No. 2,481,280. An apparatus for transferring mail from a railway to an airplane is shown in U.S. Pat. No. 1,992,800. However, none of these patents is directed particularly to the modern problem of handling relatively great loads of people or goods and the difficulty involved in frequent stops by large aircraft.

SUMMARY OF THE INVENTION

The invention comprises the combination of a primary airframe that has an inner recess, a guide airframe suspended below the primary airframe and a surface vehicle having a configuration that fits within the primary airframe recess. Means is provided for raising or lowering the guide airframe relative to the primary airframe in order to receive or discharge surface vehicles as desired.

It is one object of this invention to minimize the number of ground stops required of large modern aircraft where all or a portion of the load carried by the aircraft is to be discharged or received.

Another object of the invention is to minimize the width and length of runways required for the handling of large aircraft except at terminal facilities at which movement of the aircraft actually comes to a halt.

Other objects of the invention are to facilitate escape of persons from flying aircraft and to permit landing of passengers through ground fog and low visibility.

Another object of the invention is to minimize the difficulties encountered by aircraft in ground travel at or near terminals by substituting in their places more maneuverable surface vehicles.

DESCRIPTION OF THE DRAWINGS

FIG. 1 is a somewhat schematic view showing the operation of the elements of the instant combination;

FIG. 2 is a side view of the primary airframe, showing the surface vehicles loaded therein, the central portion of the view being in section;

FIG. 3 is a cross-sectional view taken along line 3—3 in FIG. 2 at an enlarged scale;

FIG. 4 is a side elevation view of the surface vehicle;

FIG. 5 is a top view of the surface vehicle shown in FIG. 4;

FIG. 6 is a front view of a surface vehicle;

FIG. 7 is a rear view of the surface vehicle;

FIG. 8 is a typical sectional view taken along line 8—8 in FIG. 4;

FIG. 9 is an enlarged sectional view taken along line 9—9 in FIG. 4 showing the relation of the grasping hook and post.

DESCRIPTION OF THE PREFERRED EMBODIMENT

This disclosure is concerned with the elimination of the necessity of landing larger aircraft and taking off from a field each time that a portion of a load is received or discharged. A self-powered surface vehicle is used as a loading compartment for passengers or freight. A small aircraft attached to the primary airframe flies over the vehicle and attaches itself to the vehicle. It is used to attach a cable to the vehicle and carry it upwardly to the primary airframe as the cable is retracted by a winch or other mechanism. Similarly, the load can be lowered and guided to a safe landing, at which time the small aircraft releases itself from the surface vehicle.

As shown in FIG. 1, the primary airframe 10 is relatively large, being of the type now in use in aircraft commonly termed "Jumbo" jets. Such airframes have the capacity of handling several hundred human passengers and/or vast quantities of freight. However, it is impractical for such large craft to land at many cities having relatively small populations, since the costs involved in landing and taking off such aircraft exceed the profits available from operating in such areas. According to this disclosure, the airframe 10 would not be required to stop in order to pick up or discharge part or all of its load. This would be accomplished, except at terminal facilities, by using surface vehicles 11 which are capable of attaining speeds synchronous with the slower flying speeds of the aircraft 10. The vehicle 11 can be selectively gripped by a guide aircraft 12 which can be raised or lowered relative to the airframe 10 by means of a cable 13 or other flexible connection.

Referring to FIGS. 2 and 3, it can be seen that the interior of the airframe 10 includes a lower open recess 14 within which one or more vehicles 11 can be received or stored. The vehicles 11 are received and discharged through longitudinal doors 15 which might be hinged as shown, or which might slide along the length of the airframe. Such doors have been previously used for discharging bombs from aircraft, and are conventional. In the present instance, each door 15 also includes a track 16 for support of a vehicle 11 in the area immediately above the doors after doors 15 have been closed to a position flush with the exterior of the aircraft. The recess 14 further includes a portion 17 adapted to receive the guide aircraft 12. A winch or other lifting device attached to the upper end of cable 13 is indicated generally at 18. Again, the structure of the winch is believed to be conventional.

The details of a typical vehicle 11 are shown in FIGS. 4 through 9. Its construction is similar to airframe construction in use today although it requires no wings, since it does not fly by itself. It includes a generally cylindrical body 20 supported by steerable front wheels 22 and rear wheels 21. The wheels might be powered as in a conventional automobile. However, for fast acceleration there are shown two jet engines at 22 near the rear of the vehicle. The body 20 is provided with a steering rudder 24 and stabilizer 25 used to maintain the orientation of the body as desired when airborne. The vehicle illustrated is designed for passenger use, and includes seats 26 (FIG. 8) and conventional access doors 27. For stopping purposes when the vehicle 11 has been discharged, conventional wheel brakes may be utilized. In addition, braking parachutes may be deployed from storage chambers shown in FIGS. 4 and 5 at 23. A vertical safety descent package can be employed, using front and rear parachutes stored at 28.

The body 20 has a post 30 projecting upwardly from it and terminated by an enlarged cap 31. The post 30 is supported on a longitudinally movable platform 32 within the body 20. Platform 32 is guided by rails 33. It is positioned by a cylinder or other powered device for longitudinally locating post 30 along the length of an open slot 34. The positioning of post 30 is required in order to properly balance vehicle 11 in order that it may be effectively suspended beneath the guiding aircraft 12.

The aircraft 12 may be a conventional small plane. It is conventionally powered and includes wings and conventional controls. The aircraft 12 is suspended by the cable 13. At the lower end of cable 13 is attached a hook 35 having a forwardly open throat 36 adapted to receive post 30 beneath the cap 31. A locking lever 37 is movably mounted on a hook 35 and selectively operated so as to secure hook 35 relative to the post 30.

In operation, the primary aircraft 10 can be loaded by conventional means at its terminal facilities. More desirably, it would be initially loaded with vehicles 11 by receiving such vehicles through the forward or rear ends of the airframe 10 using conventional loading procedures. At intermediate destinations, the guide/aircraft 12 would be used to lower and raise vehicles 11 as required. The travel of the airframe 10 would not be completely interrupted, since it would be necessary only for it to move to a lower altitude and slow down to a speed acceptable to the vehicle 11. When receiving a load, the aircraft 12 would fly over the moving vehicle 11, synchronizing the speed of both, and then attach to the vehicle 11. Both would then be pulled upwardly by cable 13 and received within the recess 14. Because the vehicles 11 require no wings, several such vehicles might be operated side by side on the ground and pulled into aircraft flying at slightly different altitudes.

This description is not to be limited to the precise structures illustrated. The design of the aircraft and vehicle can be changed significantly depending upon the size and type load being handled. In addition, the vehicle 11 need not be a land vehicle. It might be a water vehicle supported by a conventional hull or by hydrofoils. It might also be used for operation on ice and snow when supported by skis, thereby permitting large aircraft to operate in areas in which they cannot now land.

When used for passenger facilities, the vehicles 11 might be self-contained compartments as shown within which the passengers would remain during flight. I desired, access might be provided to other areas such as the upper portion of the airframe 10, within which larger and more comfortable seats might be provided. The vehicles 11 might also serve as escape devices during flying emergencies and could conceivably be dropped from the airframe 10 by deploying large parachutes to suspend the vehicles 11 automatically while falling.

I claim:
1. The combination of:
a primary airframe having an inner recess;
a guide airframe suspended below said primary airframe by a flexible connecting member;
a surface transport vehicle having an exterior configuration complementary to said recess;
releasable means on said guide airframe and surface transport vehicle selectively operable for attaching the vehicle to said guide airframe; and
means mounted to said primary airframe and operatively connected to said cable for raising or lowering said guide airframe relative to said primary airframe.

2. The apparatus of claim 1 wherein access to said primary airframe recess is provided by a door structure across the bottom surface thereof, said recess being adapted to receive the guide airframe while attached to said vehicle.

3. The apparatus as set out in claim 1 wherein the inner surfaces of said door structure have formed thereon tracks for supporting a vehicle within the recess for vertical support and longitudinal positioning of the vehicle within the primary airframe.

4. The apparatus as set out in claim 1 wherein the vehicle is a wheeled land vehicle having means thereon to propel the vehicle at a speed synchronous with that of the primary airframe.

5. The apparatus as set out in claim 1 wherein said primary airframe further comprises:
a bottom door structure mounted thereto and covering said recess, said door structure being alternately positionable between an open position in which the vehicle is enabled to enter the recess and a closed position in which the recess is sealed;
said last-named means comprising a winch having the upper end of said cable mounted thereto, said winch being located within said recess vertically above the door structure.

6. The apparatus as set out in claim 1 wherein the size relationship between said vehicle and the primary airframe recess is such that a plurality of vehicles can be simultaneously located within said recess.

7. The combination of a lightweight self-propelled surface vehicle designed for longitudinal travel along a straight path;
a primary airframe of substantially greater dimensions than the surface vehicle, said primary airframe including a downwardly operable recess for selectively receiving therein one or more of said surface vehicles; and
means movably mounted to said primary airframe for selectively engaging or disengaging the surface vehicle during flight and for elevating or lowering the vehicle for reception into or discharge from the recess of said primary airframe.

8. The combination as set out in claim 7 wherein said last-named means comprises:
a secondary self-powered airframe substantially smaller than the primary airframe and of a size receivable within the upper portion of the recess of said primary airframe;
a cable connecting the primary and secondary airframes; and
cooperative means at the outer end of said cable and said vehicle for selective attachment of the cable to the said vehicle.